United States Patent [19]

Seiling

[11] 4,177,030
[45] Dec. 4, 1979

[54] DOUGH DIVIDER

[75] Inventor: Samuel O. Seiling, Richmond, Va.

[73] Assignee: AMF Incorporated, White Plains, N.Y.

[21] Appl. No.: 901,410

[22] Filed: May 1, 1978

[51] Int. Cl.² .............................................. B29C 1/00
[52] U.S. Cl. .................................. 425/238; 425/145; 426/503
[58] Field of Search ................. 425/145, 238; 426/503

[56] References Cited

U.S. PATENT DOCUMENTS

| 2,007,686 | 7/1935 | Marasso | 425/238 |
| 3,658,013 | 4/1972 | Neumann et al. | 425/238 |

*Primary Examiner*—William E. Scholz
*Attorney, Agent, or Firm*—George W. Price; Charles J. Worth

[57] ABSTRACT

A Dough Divider having a ram driven by hydraulic means exerting a constant feeding force on dough in the charging chamber, and having an operating cycle which includes purging of the charging chamber.

6 Claims, 3 Drawing Figures

DOUGH DIVIDER

This invention relates generally to dough dividers and more particularly to such dividers capable of repeatedly providing groups of measured lumps of dough.

Such a machine is the subject matter of U.S. Pat. No. 2,007,686 which was granted July 9, 1935 to Fred Marasso. However, problems have arisen because of compressibility and surface adhesion tendencies of dough. As shown in the foregoing patent, a knife and ram are cam operated by mechanical linkage arrangements, the linkage arrangement for the ram includes a spring shackle. A moveable head member or division chamber with measuring pockets is cam operated by mechanical linkage between an upper position aligned with a charging chamber to receive lumps of dough and a lower position where measured lumps of dough are removed from the pockets. As the knife moves forwardly, it cuts and traps dough in the charging chamber from dough in the hopper. The ram moves forwardly pressing the trapped dough in the charging chamber through dough dividing means into the pockets of the head member. If the pockets are filled before the ram arrives at the end of its travel, the override of the ram cam is absorbed by the spring shackle. Therefore, the ram force on the dough is a function of how far the dough moves filling the pockets. Of course, variations in compressibility of the dough, surface adhesion characteristics or composition of the dough and filling of the charging chamber will be reflected by force variations of the ram. The measured lumps of dough in the pockets are severed from the dough in the charging chamber by movement of the head member from its upper position to its lower position which also closes the discharge or delivery end of the charging chamber. As the ram and knife retract, dough from the hopper is drawn into the charging chamber. There is an amount of dough remaining in the dividing means disposed in the delivery end of the charging chamber and because of its adhesion characteristics, a portion of the remaining dough will adhere to and move rearwardly with the ram. Of course, the dough which adheres to the ram will be covered by the new charge dough from the hopper. Therefore, this residue of dough will remain in the charging chamber for an indeterminate amount of time.

Accordingly, an object of the present invention is to provide a dough divider with constant force ram means for repeatedly forming measured lumps of dough substantially of equal size and weight.

Another object of the present invention is to provide a dough divider with means before recharging the charging chamber, for removing the remaining dough from the charging chamber after providing measured lumps of dough to the head member.

The foregoing and other objects and advantages will appear more fully hereinafter from a consideration of the detailed description wherein one embodiment of the invention is illustrated by way of example. It is to be expressly understood, however, that the drawing is for illustration purposes only and is not to be construed as defining the limits of the invention.

Figure 1:
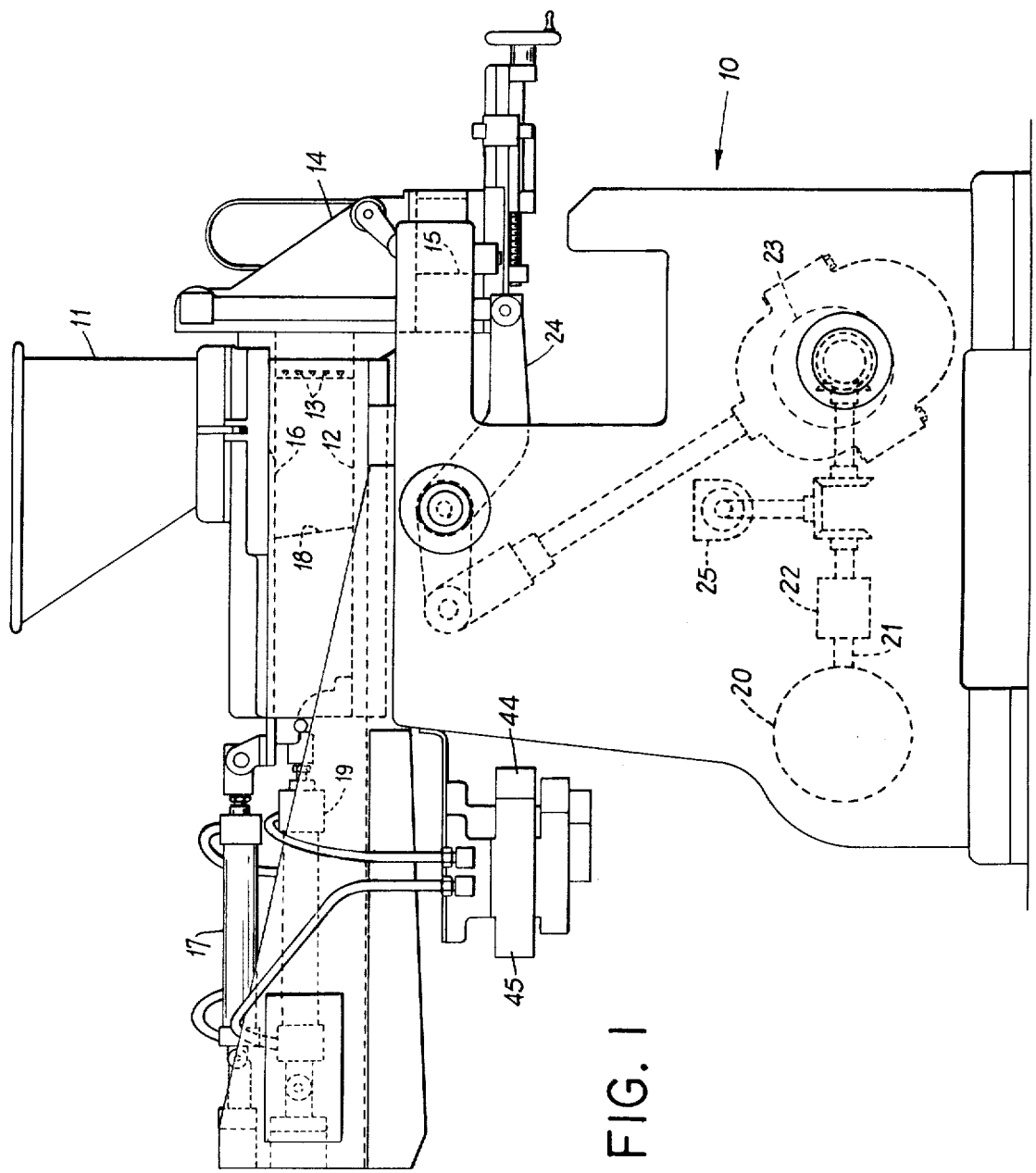
FIG. 1 is a side elevational view partly broken away, of a dough divider made in accordance with the present invention.

Referring now to the drawings and particularly to FIG. 1, a dough divider 10, similar to the dough divider of the aforenoted U.S. Pat. No. 2,007,686, has a hopper 11 which provides dough to a charging chamber 12 with dough divider means 13 in the forward discharge or delivery end thereof. The forward end of the charging chamber 12 is in communication with measuring pockets 15 of a movable head portion or division chamber 14 when such head portion or division chamber is in its upper position, as will be further discussed. A ram 18, disposed in the charging chamber 12, is reciprocally driven by an axial fluid motor 19, while a knife 16, disposed in the charging chamber 12 immediately above the ram 12, is reciprocally driven by an axial fluid motor 17.

Figure 2:
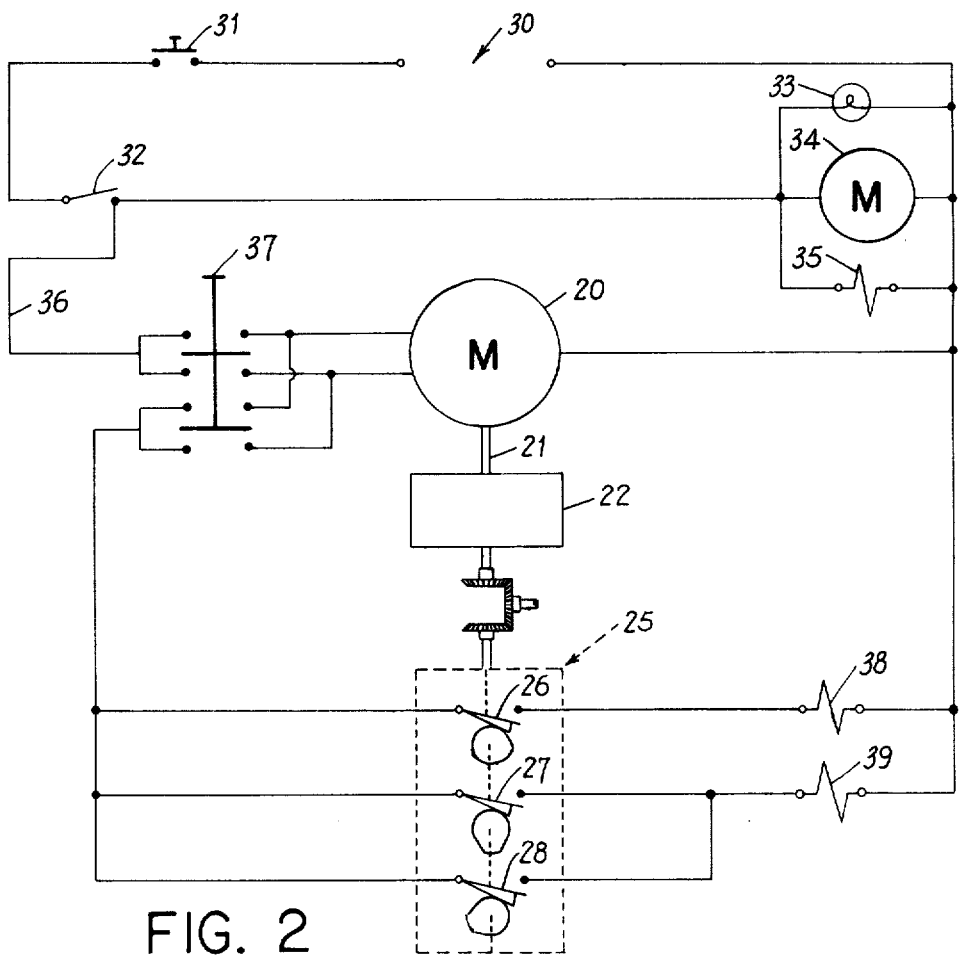
FIG. 2 is a circuit diagram of the electrical system in its simplest form for the present invention.

Referring also to FIG. 2, a two speed drive motor 20 has its output shaft 21 drivingly connected through a variable or adjustable speed coupling 22 to a rotatable cam 23 which through linkage 24 reciprocably drives or moves the head 14 between an upper dough receiving position and a lower dough discharge or delivery position. The motor 20 also drives a multiple cam switch assembly 25 of the electro-hydraulic system for the axial piston and cylinder type hydraulic motors 17 and 19, which may be of any suitable construction having multiple switches and adjustable cams to provide the necessary timed and sequence of the switches. One such switch assembly 25 would be a Model 1980 Rotating Cam Limit Switch manufactured by the Gemco Electric Division of the McGraw Edison Company at Clawson, Michigan, U.S.A.

Figure 3:
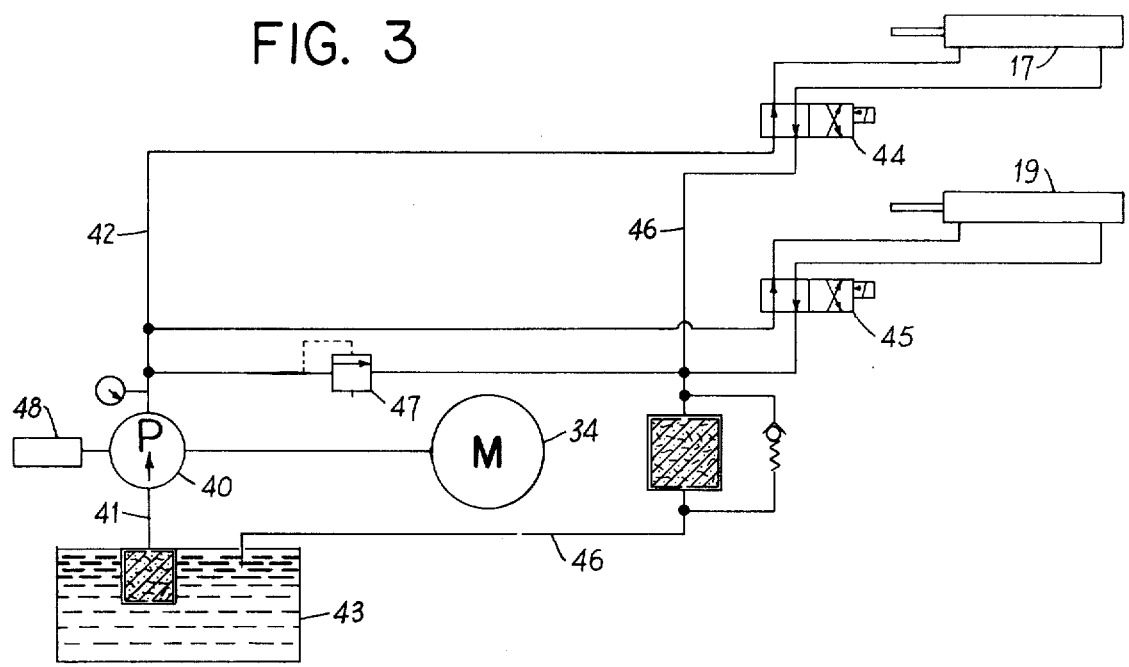
FIG. 3 is a schematic of the hydraulics embodied in the dough divider of FIG. 1.

As is diagrammatically shown in FIG. 3, the electrical circuit is connected to a power source 30 by a main on/off switch 30 which, when closed, energizes the usual safety interlocks (not shown) prior to machine operation. Prior to commencing the machine operating cycle, it is necessary to insure that hydraulic pressure is available to return the knife 16 and ram 18 to their retracted positions and that lubricant or vegetable oil is provided to the charging chamber for reducing, as possible, the adhesive characteristics of the dough. Accordingly, the main on/off switch 31, when closed, also connects a hydraulics on/off switch 32 to the power source 30.

When switch 32 is closed, an indicator lamp 33, a pump driving motor 34 and the coil 35 of a solenoid valve (not shown) controlling the flow of lubricant to the charging chamber. The closed switch 32 also provides current by a connection 36 to a double pole, three position, center off switch 37 or the equivalent thereof.

The machine is now conditioned to commence cyclic operation. This is accomplished by closing the switch 37 in one direction for high speed operation of motor 20 or in the opposite direction for low speed operation to drive cam 23 and the cams of the cam switch assembly 25.

The switch 37 has its contacts cross-connected, as shown, to provide current to all three cam operated switches 26, 27 and 28 of the switch assembly 25 simultaneously with energization of the motor 20 for either high or low speed operation. When switch 26 is cammed closed, the coil 38 of a solenoid valve 44 is energized. However, when either switch 27 or 28 is cammed closed, the coil of a solenoid valve 45 is energized.

With all of the switches 26, 27 and 28 of the cam switch assembly 25 in open condition, a constant pressure pump 40 driven by motor 34, received hydraulic fluid from a tank 43 by its inlet connection 41 and has its discharge 43 connected by solenoid valves 44 and 45 to the piston ends of the axial piston and cylinder type motors 17 and 19, respectively. The pistons of motors 17 and 19 are moved to or retained in their rearmost or retracted position with the knife 16 and the ram 18 assuming a corresponding position in the charging chamber 12. Simultaneously, the solenoid valves 44 and 45 connect the cylinder ends of motors 17 and 19 to a return line 46 to the tank 46. The pressure line 42 and the return line 46 may be connected together by a relief valve 47 responsive to momentary shock loads while the pump 40 may be provided with a pressure compensator 48.

When the switch 26 is cammed closed, the coil 38 is energized causing the solenoid valve 44 to operate and reverse connect the motor 17. At this point in time, the cyliner end of motor 17 is connected to the pressure line 42 while the piston end is connected to the return line 46. Hydraulic fluid from pump 40 will cause the piston of motor 17 to extend and drive the knife 16 forwardly in the charging chamber 12.

Similarly, when either switch 27 or 28 is cammed closed, the coil 39 is energized causing the solenoid valve 45 to operate and reverse connect the motor 19. With valve 45 in this condition, the cylinder end of motor 19 is connected to the pressure line 42 while the piston end is connected to the return line 46. Hydraulic fluid from pump 40 will cause the piston of motor 19 to extend and drive the ram 18 forwardly in the charging chamber 12.

Of course, when a closed switch 26, 27 or 28 opens, the appropriate coil 38 or 39 will de-energize causing the corresponding valve 44 or 45 to return to its original position and the appropriate motor 17 or 19 will cause the knife 16 or ram 18 to move rearwardly or retract to the charging chamber 12.

As previously discussed, a dough divider in accordance with the Marasso U.S. Pat. No. 2,007,686 has an operating cycle in which the ram is single forward and reverse strokes. When the ram moves forwardly, the knife closes the charging chamber inlet from the hopper and the charging chamber discharge is open so that the forwardly moving ram forces dough through the discharge into the pockets of the head portion. The head portion then moves to a position for delivering lumps of dough from the pockets which closes the charging chamber discharge while the knife retracts opening the charging chamber inlet so that the rearwardly moving ram draws a fresh load of dough into the charging chamber from the hopper. While the dough which adhered to the divider means presents no problems since it will be forced out of the charging chamber during the next operating cycle, the dough which adhered to the rearwardly moving ram is covered by the new load of dough and will remain in the charging chamber for an indeterminant number of operating cycles.

In accordance with the present invention, the cam 23 for operating the head portion and the cams for the switches 26, 27 and 28 are adjustable and are set to provide the desired timing and appropriate sequence of operation. The operation of the knife 16 and head portion 14 is similar to the operation of the knife and head portion of the aforenoted U.S. Pat. No. 2,007,686 except that the sequence and timing of the knife, now hydraulically driven by the motor 17, is now controlled by the cam switch 26.

While the sequence and timing of the ram 18 may be controlled by a single switch and cam having a double cam face it has been found to be more desirable two cam switches 27 and 28 connected in parallel with one another and in series with the coil 39. When cam switch 27 closes, coil 39 is energized to operate solenoid valve 45 which cross-connects motor 19. The piston end of motor 19 is now connected to the return line 46 and the cylinder end of the motor is connected to the pressure line 42 causing the piston to extend. This drives the ram 18 forwardly forcing dough out of the discharge of the charging chamber 12 into the aligned pockets 15 of the head portion 14.

Cam 23 will move the head portion 14 to its delivery position closing the discharge of the charging chamber 12 and, simultaneously, the cam switch 26 will open and re-energize coil 38 causing solenoid valve 44 to shift and connect the piston end of motor 17 to the pressure line 42 and the cylinder end of the motor to the return line 46. Pressure at the piston end of the motor 17 causes its piston to retract moving the knife rearwardly and opening the inlet of the charging chamber 12 to the hopper 11. The cam switch 27 now opens de-energizing the coil 39 causing the solenoid valve 45 to move reconnecting the piston end of the motor 19 to the pressure line 42 and the cylinder end to the return line 46. The piston of motor 19 now retracts driving the ram 18 rearwardly which draws dough from the hopper 11 into the charging chamber 12.

It has been found that by driving the ram 18 forwardly at this time, all of the dough in the charging chamber 12, except that which adhered to the divider means 13, will be purged back into the hopper 11 with a kneading or mixing action which is beneficial to the dough. Accordingly, the cam switch 28 closes and re-energizes coil 39 causing valve 45 to operate. The piston of motor 19 now extends and drives the ram 18 forwardly the full length of its stroke thereby purging dough from the charging chamber 12 into the hopper 11. The cam switch 28 now opend de-energizing the coil 39 causing the ram 18 to again move rearwardly, as previously described, and draw a load of dough from the hopper 11 into the charging chamber 12. Cam 23 now moves the head portion 14 to its original position opening the discharge of the charging chamber 12 and aligning the measuring pockets 15 with the open discharge.

The dough divider is now conditioned to commence its next operating cycle when cam switch 26 closes and energizes coil 38 thereby operating the solenoid valve 44 which cross-connects motor 17 causing its piston to extend and drive the knife 16 forwardly severing dough as it closes the inlet of the charging chamber 12 from the hopper 11.

It should now be fully understood that by providing a constant ram force and by purging the charging chamber during each operating cycle of a dough divider in accordance with the present invention, conditions heretofore deleterious to the dough are eliminated.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. In a dough divider having a repetative operating cycle for successively making groups of equal lumps of dough, a combination comprising:
   a charging chamber and dividing means for dough disposed in one end of said chamber; and
   ram means movable toward and away from said dividing means twice during each operating cycle and causing dough to load said chamber each time it moves away from said dividing means;
   said ram means exerting a constant force moving dough through said dividing means and out of said chamber the first time it moves toward said dividing means during each cycle, and purging dough from said chamber the second time it moves toward said dividing means during each cycle.

2. In a dough divider, the combination according to claim 1 further comprising:
   inlet and discharge means for said chamber;
   normally open means closing said inlet means only when said ram means moves toward said dividing means the first time during each cycle; and
   normally closed means opening said discharge means only when said normally open means closes said inlet means.

3. In a dough divider, the combination according to claim 2, and
   said normally open means comprising a knife disposed in said chamber and movable toward said dividing means for closing said inlet means;
   said normally closed means comprising a head portion having a plurality of measuring pockets aligned with said discharge means for receiving dough from said chamber when said discharge means is open; and
   said head portion severing dough in said pockets from dough in said chamber when said head portion moves said pockets out of alignment and closes said discharge means.

4. In a dough divider, the combination according to claim 3 further comprising
   a pressure fluid motor means connected to move said ram toward and away from said dividing means in response to constant pressure fluid;
   a constant pressure fluid pump means, and programmed valve means for selectively connecting said pump means to said motor means.

5. A method of repeatedly making groups of equal lumps of dough by successive cycles, each cycle comprising the steps of:
   loading dough fronm a source into a chamber,
   moving dough from the chamber through didiving means into measuring pockets;
   severing dough in the measuring pockets from the remaining dough, and
   purging dough from the chamber.

6. The method in accordance with claim 5, and comprising the further step of:
   applying a constant force for moving the dough from the chamber.

* * * * *